United States Patent [19]

Yang

[11] Patent Number: 5,426,630
[45] Date of Patent: Jun. 20, 1995

[54] OPTICAL PICKUP SYSTEM

[75] Inventor: Keun Y. Yang, Kyungki-Do, Rep. of Korea

[73] Assignee: Goldstar Co., Ltd., Seoul, Rep. of Korea

[21] Appl. No.: 217,882

[22] Filed: Mar. 25, 1994

[30] Foreign Application Priority Data

Mar. 30, 1993 [KR] Rep. of Korea ............ 1993-5101

[51] Int. Cl.$^6$ ............................................. G11B 7/00
[52] U.S. Cl. ................................. 369/112; 369/44.23
[58] Field of Search ............ 369/106, 110, 112, 44.21, 369/44.19, 44.23, 44.14; 250/201.5

[56] References Cited

U.S. PATENT DOCUMENTS 5,225,924  7/1993  Ogawa et al. .................. 359/196
5,272,685 12/1993  Ando ................................ 369/110

*Primary Examiner*—Paul M. Dzierzynski
*Assistant Examiner*—Don Wong

[57] ABSTRACT

An optical pickup system for generating information signals recorded on a recording medium includes a semiconductor laser generating source for generating and emitting a laser beam, an object lens for condensing the generated laser beam for an optical disc and receiving the laser beam reflected by an optical disc, a beam separator for changing a forwarding direction of the laser beam reflected by an object lens reflected by the optical disc, a prism for directing a portion of the beam to a pair of photo detector units provided on the prism and for forwarding the remainder of said laser beam in the same direction it was travelling when first incident on the prism, a condensing lens for condensing the laser beam reflected by the prism, and a focusing error compensating means for compensating two signals to be zero by an actuator.

8 Claims, 5 Drawing Sheets

OPTICAL PICKUP SYSTEM

BACKGROUND OF THE INVENTION

1. Field of the Invention

The present invention relates in general to an optical pickup system for generating information signals recorded on a recording medium.

2. Description of the Invention

In a conventional optical recording and reproducing system, a three beam detecting system for an optical disc as an optical recording unit has been widely used. But, the three beam detecting system has problems in that it requires a precise grating as well as highly precise processing and assembling of a deck which supports a pickup system. Further, the three beam detecting system involves additional problems, even though the operational process is securely performed, in that it requires a diffraction grating which slightly reduces the light quantity of the main beam. In addition, in the case of mounting the diffraction grating on a player, it is difficult to achieve both the proper mounting position and mounting angle.

SUMMARY OF THE INVENTION

Accordingly, the primary object of the present invention is to eliminate the problems of the prior art described hereinbefore.

Another object of the present invention is to provide an optical pickup system not requiring a precise grating. A further object of the present invention is to provide enhanced performance irrespective of the precision of assembly and manufacture of a deck which supports the pickup system.

To achieve the above objects of the present invention, the optical pickup system of the invention includes a semiconductor laser generating source for generating and emitting a laser beam, an object lens for condensing the generated laser beam onto an optical disc and for receiving the laser beam reflected by the optical disc, a beam separator for changing a forwarding direction of the laser beam reflected by the object lens to a prism, a prism for directing a portion of the laser beam to photo detectors and for forwarding the remainder of the beam in the same direction it was travelling when first incident on the prism, a condensing lens for condensing the laser beam from the prism, and a photo detecting unit for detecting the laser beam condensed by the condensing lens.

BRIEF DESCRIPTION OF THE DRAWINGS

FIGS. 5A, 5B, 6A and 6B illustrate the laser beam detected by a photo detecting unit mounted on the prism, in which: FIGS. 5A and 5B illustrate a state in which the distance between the object lens and the optical disc has increased; and FIGS. 6A and 6B illustrate a state in which the distance between the object lens and the optical lens has decreased.

FIG. 7A illustrates a state in which the distance between the object lens and the optical lens has increased; and FIG. 7B illustrates a state in which the distance between the object lens and the optical lens has decreased.

FIGS. 9A to 9C illustrate the tracking error of the optical pickup system of the present invention, in which FIG. 9A illustrates no tracking error, FIG. 9B illustrates the case wherein the condensed beam of the laser is off-track toward the center of the disk thereof, and FIG. 9C illustrates the case wherein the condensed beam of the laser is off-track outwardly from the center of the disk.

DESCRIPTION OF THE PREFERRED EMBODIMENTS

Figure 1:
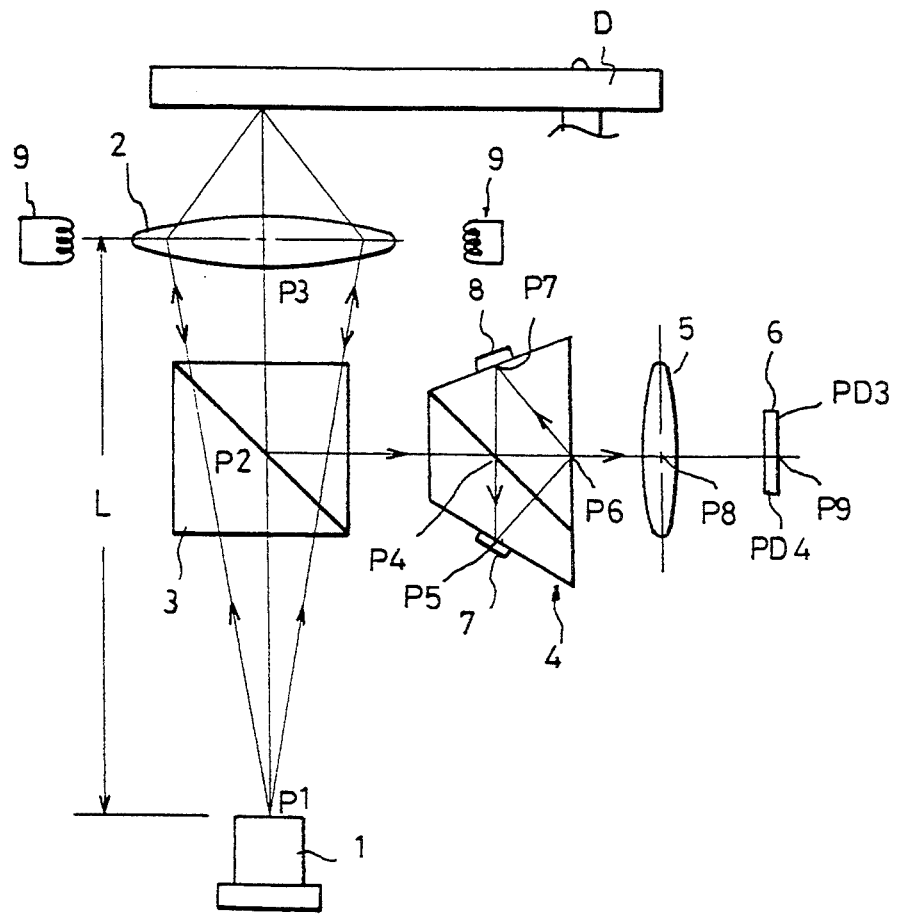
FIG. 1 is a schematic view illustrating the configuration of an optical pickup system according to an embodiment of the present invention.

The invention will be more readily understood by reference to the accompanying drawings which illustrate the optical pickup system according to the present invention. Referring to FIG. 1, a laser beam generated by a semiconductor laser generating source 1 is condensed through a beam separator 3 and an object lens 2 as a spot on an information recording medium such as an optical disc D. Further, the condensed position can be adjusted by controlling the object lens 2 by an actuator 9.

Meanwhile, the laser beam reflected by the optical disc D is received onto the beam separator 3 through the object lens 2. The reflected laser beam passing the objects lens 2 has its direction changed by the beam separator 3. There is provided a Pechan prism 4 having an interface, at least an upper and lower inclined surface, so as to direct a portion of the laser beam to photo detectors and for forwarding the remainder of the beam in the same direction it was travelling when first incident on the prism. In addition, there are also provided photo detecting units 7 and 8 on a central portion of the lower and upper inclined surfaces of the prism 4, respectively. On the right side of the prism 4, a condensing lens 5 is provided for condensing the laser beam coming from the prism 4 and, further, a photo detecting unit 6 is provided for detecting the laser beam condensed at a predetermined distance. The photo detecting unit 6 is divided into two parts, PD3 and PD4 (FIG. 4B).

Figure 2:
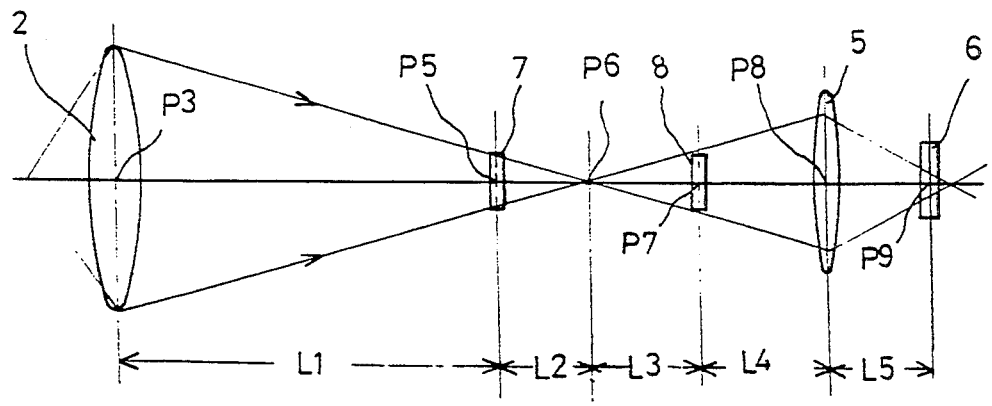
FIG. 2 is a development view illustrating the function of the optical pickup system according to the embodiment of FIG. 1.

The optical pickup system according to the present invention, as described above, has the distance L between the semiconductor laser generating source 1 and the object lens 2 the same as the distance L1+L2 between the object lens 2 and the focus position P6 as illustrated in FIG. 2.

Figure 3:
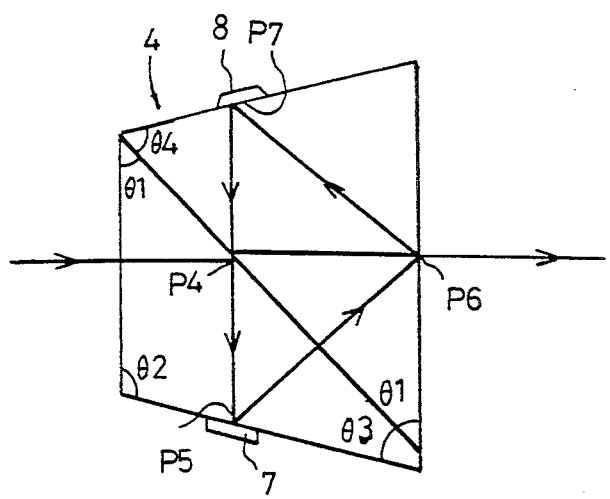
FIG. 3 is a view illustrating the path of a laser beam from a prism adapted to the embodiment of FIG. 1.

Meanwhile, the prism has $\theta_1 = 45°$ where $\theta_1$ is measured between an interface in the prism and an incidence side, and $\theta_1' = 45°$ where $\theta_1'$ is measured between the interface and a reflection side. Also, $\theta_4 = 67°30'$ where $\theta_4$ is measured between the upper inclined surface and the interface, $\theta_3 = 22°30'$ where $\theta_3$ is measured between the lower inclined surface and the interface;

and $\theta_2 = 112°30'$ where $\theta_2$ is measured and between the surface of incidence and a side of the prism, as illustrated in FIG. 3.

Figure 4A:
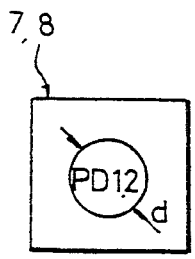
FIG. 4A is a structural view illustrating a photo detecting unit provided on the prism including the optical pickup system.
Figure 4B:
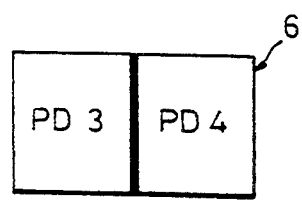
FIG. 4B is further a structural view illustrating another photo detecting unit provided on the prism the invention.

As illustrated in FIGS. 3 and 4A, photo detecting units 7 and 8, having a diameter "d" of effective light receiving surface, are provided on the lower and upper inclined surfaces and of the prism, respectively. In addition, photo detecting unit 6 is provided at position P9 which is just in front of a position of which the laser beam is condensed by the condensing lens 5.

In FIGS. 1 and 2, L denotes a distance between the semiconductor laser generating source 1 and the object lens 2, L1 a distance between the photo detecting unit 7 and the object lens 2, L2 a distance between the photo detecting unit 7 and the focus point P6, L3 a distance between focus point P6 and the photo detecting unit 8, L4 a distance between the photo detecting unit 8 and the condensing lens 5, L5 a distance between the condensing lens 5 and the photo detecting unit 6, and P1 denotes the position of the semiconductor laser light source.

The operational effects of the optical pickup system will be described hereinbelow.

As illustrated in FIG. 1, the laser beam generated by the semiconductor laser generating source 1 is condensed by the object lens 2 through the beam separator 3, and the condensed beam is reflected by the optical disc D.

Thus, the reflected beam is condensed again by means of the object lens 2 and is received on the prism 4 after having its direction changed by the beam separator 3 provided between the object lens 2 and the semiconductor laser generating source 1.

The laser beam received on the prism 4 is divided by an interface so that a portion thereof proceeds along a predetermined path, as illustrated by arrows in FIG. 3, and is incident on photo detector units provided on the prism. The remainder of the beam is forwarded to the condensing lens 5 and is condensed on the photo detecting unit 6 by means of the condensing lens 5.

The photo detecting units 7 and 8 detect the moving state of the optical disc D, and the photo detector unit 6 detects the information recorded on the optical disc D.

A more detailed description of a procedure for detecting the moving state and the recorded information will be given hereinbelow.

After the laser beam generated by the semiconductor laser generating source 1 is condensed on the optical disc D by means of the object lens 2, and after the laser beam, which has been reflected by the disc D is again condensed by means of the object lens 2, the position of the focus will be at a position which is a distance L from the object lens 2. Thus, the position of the focus, if beam separator 3 were not disposed in the beam path, would be at the generating point of the semiconductor laser generating source 1.

With the beam separator 3 in place and disposed between the object lens 2 and the semiconductor laser generating source 1, the beam which has been reflected by disc D is condensed to a focus at P6.

As illustrated in FIG. 1, when the prism 4 is provided at a position such that $L = L1 + L2$, the laser beam will be condensed at position P6. After being condensed at position P6, the laser beam will begin diverging again after the prism 4, as illustrated in FIG. 2.

The laser beam coming from the prism 4 is condensed again by means of the condensing lens 5, and the condensed beam is detected by means of the photo detecting unit 6.

When the optical disc D is present at the precise position the beam is to be condensed, the laser beam is condensed on P6, but if wobble occurs during the rotation of the optical disc D, or if a difference in thickness occurs during manufacturing the optical disc there will be a focusing error because of not having been exactly condensed on the optical disc D, so that the laser beam will be condensed before or behind P6.

Figure 7A:
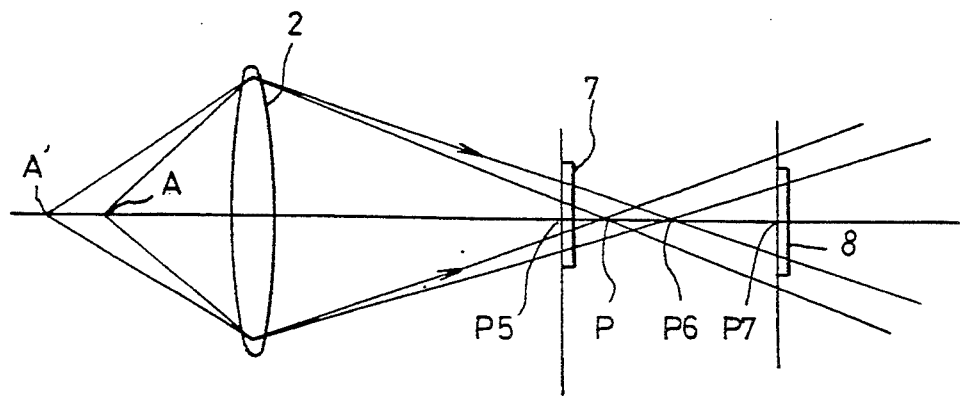
FIGS. 7A and 7B illustrate the size of laser beam incident on the photo detecting units provided on the prism, in which:i
Figure 7B:
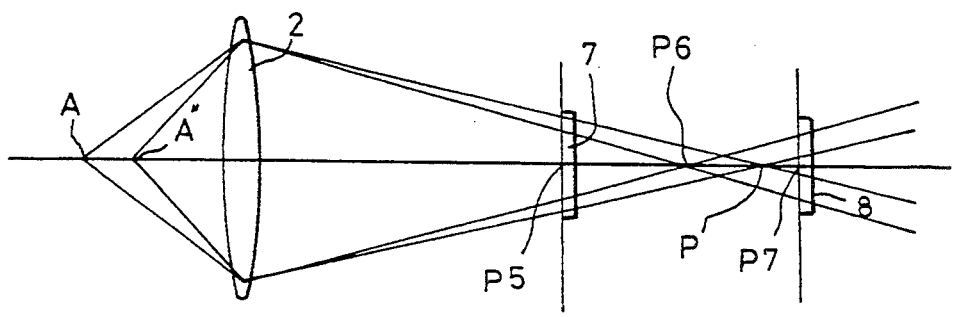

Thus, when the distance between the optical disc D and the object lens 2 increases, as illustrated in FIG. 7A, the condensing point A moves to A' so that the laser beam is condensed to P located before P6, as illustrated in FIG. 7B. When the distance between the optical disc D and the object lens 2 decreases, the condensing point A moves to A'', so that the laser beam is condensed to P'' located behind P6.

Figure 5A:
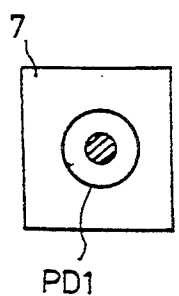
Figure 5B:
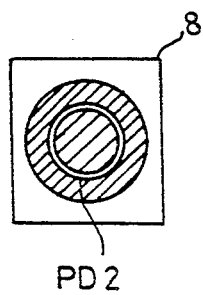
Figure 6A:
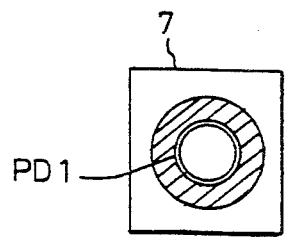
Figure 6B:
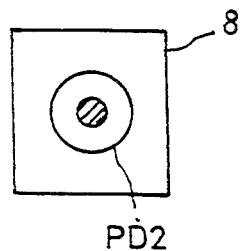

As described above, when the laser beam is condensed before or behind P6, the light quantities which the photo detecting units 7 and 8 (mounted on the prism 4) detect will be changed. If the condensing point is before P6, as illustrated in FIGS. 5A and 7A, the beam spot size becomes narrower than an effective receiving surface of the photo detecting unit 7, so that the photo detecting unit 7 is available to detect the intensity of the laser beam without any loss. But, as illustrated in FIGS. 5B and 7B, if the laser beam is condensed behind P6 the photo detecting unit 8 mounted at P7 can't detect a part of the laser beam since the size of the laser beam becomes larger than the effective light receiving surface of the detector.

Thus, when the condensing point is at P6, the size of the laser beam which the photo detecting units 7 and 8 detect will be the same. Thus, since both the size of the laser beam and the effective light receiving surface will be the same, the intensity of the laser beams which are detected by the two photo detecting units 7 and 8 will be the same.

Therefore, the focusing error can be detected by comparing the outputs of the two photo detecting units 7 and 8.

For example assuming the detecting signal of the photo detecting unit 7 is S1, and the detecting signal of the photo detecting unit 8 is S2, the focusing error signal (FES) is S1-S2. If FES is zero, there will not occur any focusing error. In the case of FES>0, the distance between the object lens 2 and the optical disc D is farther than desired. In case of FES<0, the distance between the object lens 2 and the optical disc D is closer than desired.

Thus, the focusing error can be adjusted by adjusting the object lens 2 using the actuator 9 according to the FES.

In addition, the optical information signals detecting the information recorded on the optical disc D can be obtained by adding the two signals S1 to S2.

Thus, one formula may be obtained: "Optical information signals $= S1 + S2$."

Meanwhile, in the case of obtaining information recorded on the optical disc D, there will be a tracking error when the laser beam deviates from the track of the optical disc D in addition to the above described focusing error.

The function of detecting the tracking error is achieved with the photo detecting unit 6 mounted on P9, as described above.

Figure 8:
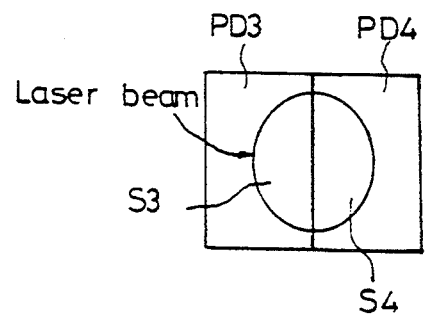
FIG. 8 is a front view illustrating the photo detecting unit for describing a tracking error of the optical pickup system of the present invention.
Figure 9A:
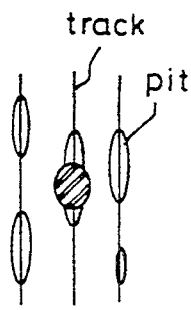
Figure 9B:
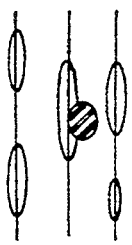

The case of there being no tracking error is illustrated in FIGS. 8 and 9A, wherein the outputs of detectors PD3 and PD4, (which consist of the photo detecting units 6) are equal. As illustrated in FIGS. 8 and 9B, when the laser beam is incident off track-center toward the center of the optical disc D, the signal S4 grows larger than the signal S3.

Figure 9C:
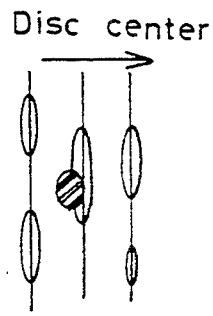

In addition as illustrated in FIGS. 8 and 9C, when the laser beam is incident off track-center outward from the center of the optical disc D, the signal S3 grows larger than the signal S4.

Therefore, assuming the tracking error signal (TES) is S3-S4, if TES is 0(zero), there will not have occurred any tracking error. However, if TES>0, the laser beam is incident off track-center outwardly from the center of the optical disc D. And if TES<0, the laser beam is incident off track-center inwardly from the center of the optical disc. Thus, the tracking error can be compensated by means of adjusting the actuator 9.

Accordingly, in the optical pickup system according to the present invention, the optical information recorded on the optical disc D can be generated without error by compensating for the focusing error and tracking error when obtaining the optical information signals.

As described above, the optical pickup system according to the present invention can be used for Compact Disc Player (CDP), Video Disc Player (VDP), Optical Disc Driver(ODD), Mini Disc Player (MDP), and any kinds of Mini Disc which use the optical pickup system.

Thus, the optical pickup system according to the present invention does not require the conventional precise grating as previously used in 3-beam detecting system. In addition, detecting the focusing error by means of the beam size by using the prism achieves higher precision than the conventional three beam system with its expected manufacturing effects.

What is claimed is:

1. An optical pickup system, comprising:
   a semiconductor laser generating source for generating and emitting a laser beam;
   an object lens for condensing said laser beam on an optical disc and receiving the laser beam reflected by said optical disc;
   a beam separator for changing a forwarding direction of the laser beam reflected by said optical disc,
   a prism for directing a portion of the laser beam from said beam separator through a predetermined path and forwarding the remainder of said laser beam in the same direction as it was travelling when first incident on the prism, said prism including lower and upper surfaces inclined at a predetermined angle to each other with each of said surfaces having a photo detector unit attached thereto;
   a condensing lens for condensing the laser beam from said prism; and
   a first photo detecting unit for detecting said laser beam condensed by said condensing lens.

2. The optical pickup system of claim 1, wherein said first photo detecting unit is provided at an end of forwarding path of the laser beam.

3. The optical system of claim 2, wherein said first photo detecting unit is divided into two parts.

4. The optical pickup system of claim 1, wherein said prism is of the Pechan prism type.

5. The optical pickup system of claim 1, wherein said prism is made of glass.

6. The optical system of claim 1, wherein said prism includes an interface for splitting off a portion of the beam and: the angle between the interface of said prism and a light incidence surface of said prism is 45°; the angle between said upper inclined surface and said interface is 67°30′; and the angle between said lower inclined surface and said interface is 22°30′.

7. The optical pickup system of claim 1, wherein the distance between said semiconductor laser generating source and said object lens is the same as the distance between said object lens and a focus of the reflected beam.

8. An optical pickup system, comprising:
   a semiconductor laser generating source for generating and emitting a laser beam;
   an object lens for condensing said generated laser beam on an optical disc and receiving said laser beam reflected by said optical disc;
   a beam separator for changing a forwarding direction of said laser beam reflected by said optical disc;
   a prism for directing said laser beam from said beam separator and forwarding said laser beam through a predetermined path and then in; the same direction it was travelling when first incident on said prism, wherein said prism includes lower and upper surfaces at a predetermined angel and wherein a photo detecting unit is provided on each of said inclined lower and upper surfaces of said prism, respectively;
   a condensing lens for condensing said laser beam reflected by said prism;
   a photo detecting unit for detecting a beam condensed by said condensing lens; and
   an actuator for adjusting said object lens to compensate a focusing error.

* * * * *